United States Patent [19]
Montazer

[11] Patent Number: 5,771,265
[45] Date of Patent: Jun. 23, 1998

[54] METHOD AND APPARATUS FOR GENERATING ELECTRICAL ENERGY FROM NUCLEAR WASTE WHILE ENHANCING SAFETY

[76] Inventor: Parviz Montazer, 4622 Green Tree La., Irvine, Calif. 92615

[21] Appl. No.: 769,868

[22] Filed: Dec. 19, 1996

[51] Int. Cl.[6] .............................. G21C 19/00; G01J 19/00
[52] U.S. Cl. .......................... 376/272; 376/273; 376/275
[58] Field of Search ................................... 376/272–276, 376/283, 284

[56] References Cited

U.S. PATENT DOCUMENTS

| | | | |
|---|---|---|---|
| 2,836,554 | 5/1958 | Fermi et al. | 376/383 |
| 3,755,076 | 8/1973 | Lindsley | 376/273 |
| 3,911,684 | 10/1975 | Busey | 376/272 X |
| 4,291,536 | 9/1981 | Girard | 376/272 X |

*Primary Examiner*—Charles T. Jorden
*Assistant Examiner*—Matthew J. Lattig
*Attorney, Agent, or Firm*—Leonard Tachner

[57] ABSTRACT

A method and apparatus for generation of electricity from packages of spent-fuel rods either on a remote site or in a permanent underground waste repository. It can also be applied to abandoned deep mines with high temperatures. Also many low-temperature geothermal reservoirs can generate electricity economically. Each individual fuel rod assembly is estimated to produce about 8 kilowatts and the total assemblies in the United States can generate about 63 megawatts of heat. Although this energy cannot be used to generate steam, it is harnessed in the invention by inducing ventilation in shafts constructed as part of an underground mined facility or by installation of ventilation chimneys at reactor sites. Natural ventilation phenomena has been observed and historically used to supply air in mines. It is also the same process that makes chimneys work in fire places and industrial furnaces. In addition to generating electricity, in application to nuclear waste repository design, observations and numerical simulations have shown that, with natural ventilation in accordance with the invention, the repository host-rock temperature may also be kept below 30 degrees Celsius and its moisture conditions kept dry for at least 10,000 years at the proposed high-level radioactive waste repository.

4 Claims, 15 Drawing Sheets

METHOD AND APPARATUS FOR GENERATING ELECTRICAL ENERGY FROM NUCLEAR WASTE WHILE ENHANCING SAFETY

BACKGROUND OF THE INVENTION

1. Field of the Invention

The present invention relates generally to nuclear waste disposal and more particularly to a method and apparatus for generating electrical energy from spent nuclear fuel while keeping the surrounding repository environment at a low temperature and dry thereby enhancing safety.

2. Background Art

The United States Department of Energy and other organizations overseas (England, France , Germany, Sweden, and Switzerland) have been conducting research to evaluate the suitability of underground environment for high level radioactive waste repository. Site characterization and scientific investigations have focused on evaluating various scenarios that would make the repository safe for a period of at least 10,000 years or longer.

Spent-fuel rods are removed from the nuclear power plants when their temperature is not high enough to generate steam needed to generate electricity. Currently, these spent-fuel rods are kept in a water pool at the plants awaiting an interim monitoring and retrieval storage (MRS) facility and eventually a permanent underground nuclear waste repository to be built by the Department of Energy. In Foreign countries, similar plans are being investigated.

In the United States, Yucca Mountain has been chosen as a potential site and is being investigated. Yucca Mountain is a north-south trending ridge in the Basin and Range province, about 150 km northwest of Las Vegas, Nev. (see FIG. 1). It consists of alternating layers of interbedded, welded and non-welded tuffaceous formations which range from porous, non-welded ash-flow deposits to massive welded ash-flow and ash-fall deposits. Physical and hydrological characteristics of these formations are highly variable. The annual precipitation is estimated to be about 0.17 meters, and the evapotranspiration is considered to be extremely variable but generally high. The hydrological system is characterized by fluid flow through vastly heterogenous fractured and porous layers of volcanic tuffs in the unsaturated zone and major fault zones. The proposed location of the nuclear waste repository is in the unsaturated zone. The unsaturated zone ranges in thickness from 450 to 750 meters. (Montazer, P., and W. E. Wilson, 1984, "CONCEPTUAL HYDROLOGIC MODEL OF FLOW IN THE UNSATURATED ZONE, YUCCA MOUNTAIN, NEVADA", U.S. Geological Survey, Water Resources Investigation Report 84-4345) and (TRW, 1995, TOTAL SYSTEM PERFORMANCE ASSESSMENT-1995, An evaluation of the Potential Yucca Mountain Repository).

In other countries, disposal in mined facilities in salt, crystalline rocks, and sedimentary rocks are being considered. The concepts and ideas presented here are applicable with slight modification to these sites as well. The major difference between the sites considered overseas and in the United States is that overseas, the mined facility is usually below the water table. In the United States, only above-water table disposal is considered. In the past the United States has considered disposal in underground mined repositories in crystalline and salt rocks below water table. Defense waste is currently planned to be stored in bedded salt near Carlsbad, New Mex. The concept presented here may not be applicable to salt because of the instability of the salt over long periods of time.

The most important technical issue in repository construction is isolation of radio nuclides. Thermal and moisture conditions of the repository are two of the important processes that influence this containment. These factors affect corrosion of the waste package which may result in the release of radio nuclides. Migration of radio nuclides, if released, is primarily controlled by the hydro geologic and geochemical properties of the rock and processes in the system. Thermal stability of the repository depends on the thermal loading (i.e., density of the waste canisters) and thermo-mechanical properties of the host rock.

To contain the radio nuclides, the current concept is to seal (or backfill) the repository with crushed tuff or similar material (TRW, 1995) after 100 years of repository pre-closure period. Although some considerations have been given to the design with no sealing of the repository, the results have not been satisfactory in the past due to the resulting high temperature levels (above 100 degrees Celsius) because no ventilation was allowed in previous conceptual designs.

The uncertainty in water flux through the repository has been one of the most investigated subjects and probably the least resolved issue in these projects. Various mechanisms affect moisture movement in the unsaturated zone (above-water table disposal) that make quantification very difficult. Estimated infiltration and percolation flux have ranged from 0.01 to 4.5 mm/year. Larger values were reported by United States Geological Survey in a recent presentation at the Nuclear Waste Technical Review Board (held in Denver, Colo. in July 1996). Climatological variations over 10,000 years add considerable uncertainty to these estimations. Fault zones and preferential pathways have been found and the contrast in hydro geological characteristics between fractures and the rock matrix in these features has made characterization of flux even more difficult.

The transport of the heat away from the repository, and its effect on radio nuclide containment depend on the hydro geology, total amount of heat source and specific design options. The current conceptual design of the repository together with waste emplacement scenarios for the United States are given in the TSPA report (TRW, 1995). Although a number of thermal loading options have been studied by various investigators, recent studies are based on two thermal loading options termed "low" and "high" thermal loads (TRW, 1995). The "low" thermal load option is designed to minimize hydrologic disturbance. The "high" thermal load option is assumed to keep the waste packages dry for an extended period of time by evaporating any nearby water (Buscheck, T. A. and J. J. Nitao, 1993, THE ANALYSIS OF REPOSITORY HEAT-DRIVEN HYDROTHERMAL FLOW AT YUCCA MOUNTAIN, Proceedings of the Fourth International High Level Radioactive Waste Management Conference, Las Vegas, Nev., April 26–30). However, in both cases the temperature in the host rock rises to above 100 degrees Celsius and no significant reduction in the near-field saturation is predicted after decay of the heat load. In neither case is generation of electricity from the waste heat considered. Neither case considers ventilation due to thermal load of the spent nuclear waste over an extended period of time.

SUMMARY OF THE INVENTION

Natural ventilation can be taken advantage of to generate electricity. Also the fractured nature of the rocks in the unsaturated-zone disposal schemes are the key features that may be exploited to increase the safety of the repository.

Recent observations in the Exploratory Studies Facility (ESF) tunnel at the Yucca Mountain by the inventor, have indicated that ventilation can remove substantial amounts of moisture and heat from the tunnel host rock in a very short period of time. The fractured nature of the rock will facilitate advection of the vapor and heat. Therefore, by naturally ventilating the repository and taking advantage of the thermal drive of the waste package, the repository host rock may be kept dry for over 10,000 years. The amount of moisture removed from the rocks during this time will create a thick low-saturation skin around the drifts that will require thousands of years to re-saturate. Ventilation can also remove large amounts of heat generated by the waste canisters. In case of the TSPA's proposed approach (current concepts), there is very little moisture removal from the system and re-saturation can occur much more rapidly than in the naturally-ventilated case. In an unventilated case (backfilled repository), the moisture will be forced away from the repository. The moisture will be trapped under an umbrella that will eventually return and re-wet the repository.

OBJECTS OF THE INVENTION

It is a principal object of the invention to provide a method and apparatus for generating electrical energy from spent nuclear fuel rods.

It is another object of the invention to provide a method and apparatus for configuring a radioactive waste repository for generating electrical energy using the waste material as a heat source.

It is still another object of the invention to provide a method and apparatus for enhancing the safety of a nuclear waste repository while generating electrical energy from such waste.

It is still another object of the invention to provide a method and apparatus for reducing the temperature and increasing the dryness of nuclear waste repositories.

It is still another object of the invention to provide a method and apparatus for generating electrical energy from abandoned mines and other large enclosed structures having a large heat source contained therein.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF PREFERRED EMBODIMENTS

Based on the present accumulation of the spent-fuel rods, it is estimated that more than 63,000 kilowatts of heat can be generated from the spent-fuel rods. This heat is produced from the natural decay of the uranium and other radioactive material in the fuel rods. In addition, the rock at depth has a geothermal temperature that is at least 10 degrees Celsius higher than the average annual temperature. Computer simulations have shown that this amount of heat can generate substantial amount of air flow if the spent-fuel rods are properly placed in a tunnel connected to a shaft or any compartment that is connected to a chimney. The tunnel and shaft combination is the most likely use of this concept since the current disposal plan is for such configuration. However, if plans change and other configurations are considered for disposal of the spent-fuel rods, the generated heat can be used to induce air flow from which electricity may be generated.

OBSERVATIONS IN ESF TUNNEL

Continuous monitoring of the temperature, pressure, and humidity in the ESF tunnel has indicated that there is substantial heat and moisture loss from the rock as a result of forced ventilation air. Currently, the tunnel is not connected to any shaft; therefore, the potential for natural ventilation is uncertain. However, large air flow rates have been observed in some of the relatively large diameter (0.44 meters) open holes at the Yucca Mountain site. Natural air currents have also been used historically in mine-ventilation applications. In fact, in some mine-ventilation applications fire has been used at the bottom of shafts to generate air flow.

SIMULATION OF MOISTURE AND HEAT REMOVAL THROUGH NATURAL VENTILATION

Simulations were made to evaluate the effect of ventilation on removal of moisture and heat from the repository host rock. The coupling of the atmospheric processes with the rock was simulated using A-TOUGH (Montazer, P., 1994, A-TOUGH, A COMPUTER CODE FOR SIMULATION OF ATMOSPHERIC INTERFACE WITH FRACTURED ROCKES, International High-Level Radioactive Waste Conference, Las Vegas, Nev., May, 1994) and (Multimedia Environmental Technology, Inc., 1995, USER'S MANUAL FOR A-TOUGH, An Atmospheric Interface Model Based on V-TOUGH). A-TOUGH is a numerical code which was developed for simulation of coupled atmospheric-soil (or rock) processes.

Figure 1:
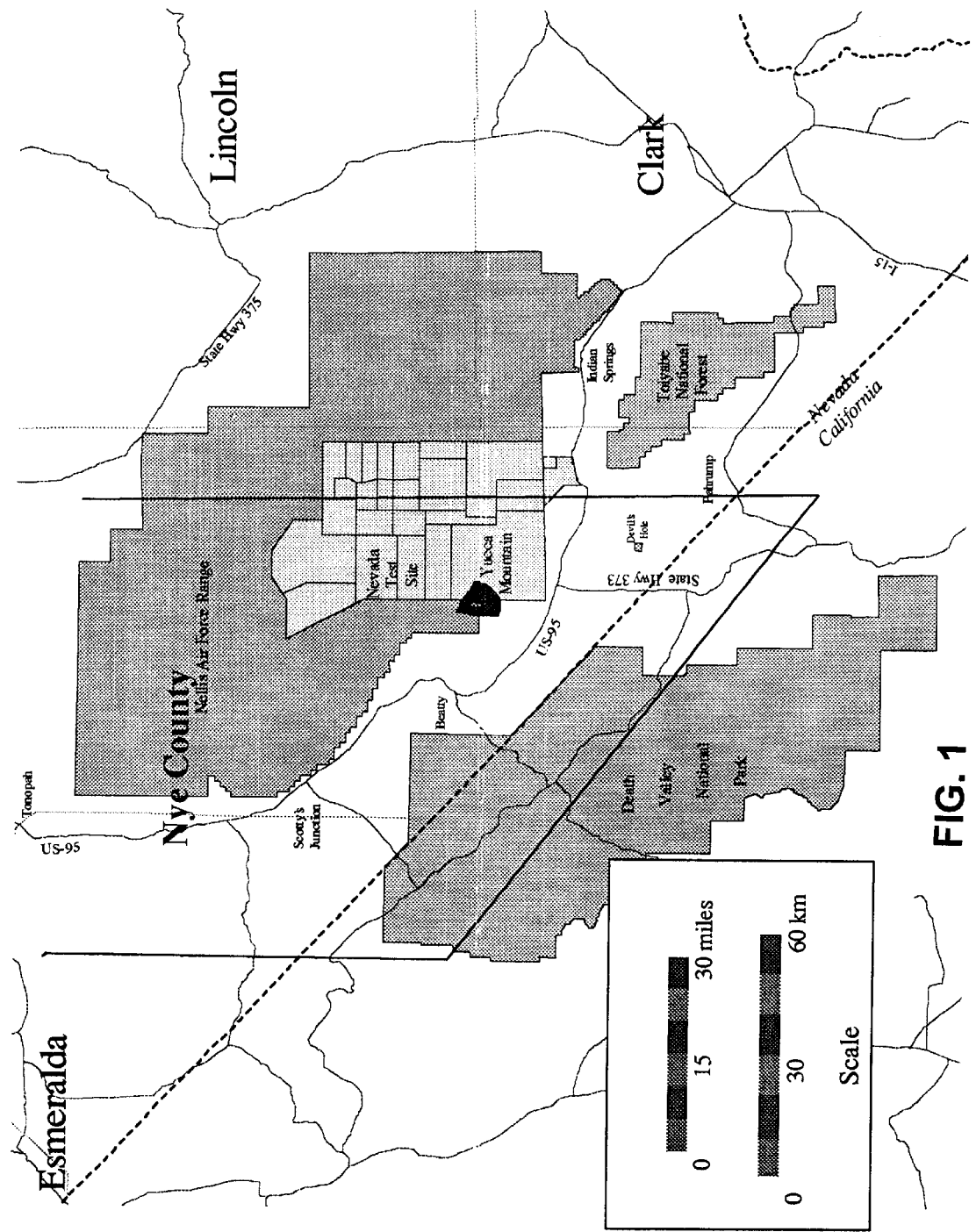
FIG. 1 is a map illustrating the location of a planned nuclear waste repository at Yucca Mountain, Nevada.
Figure 2:
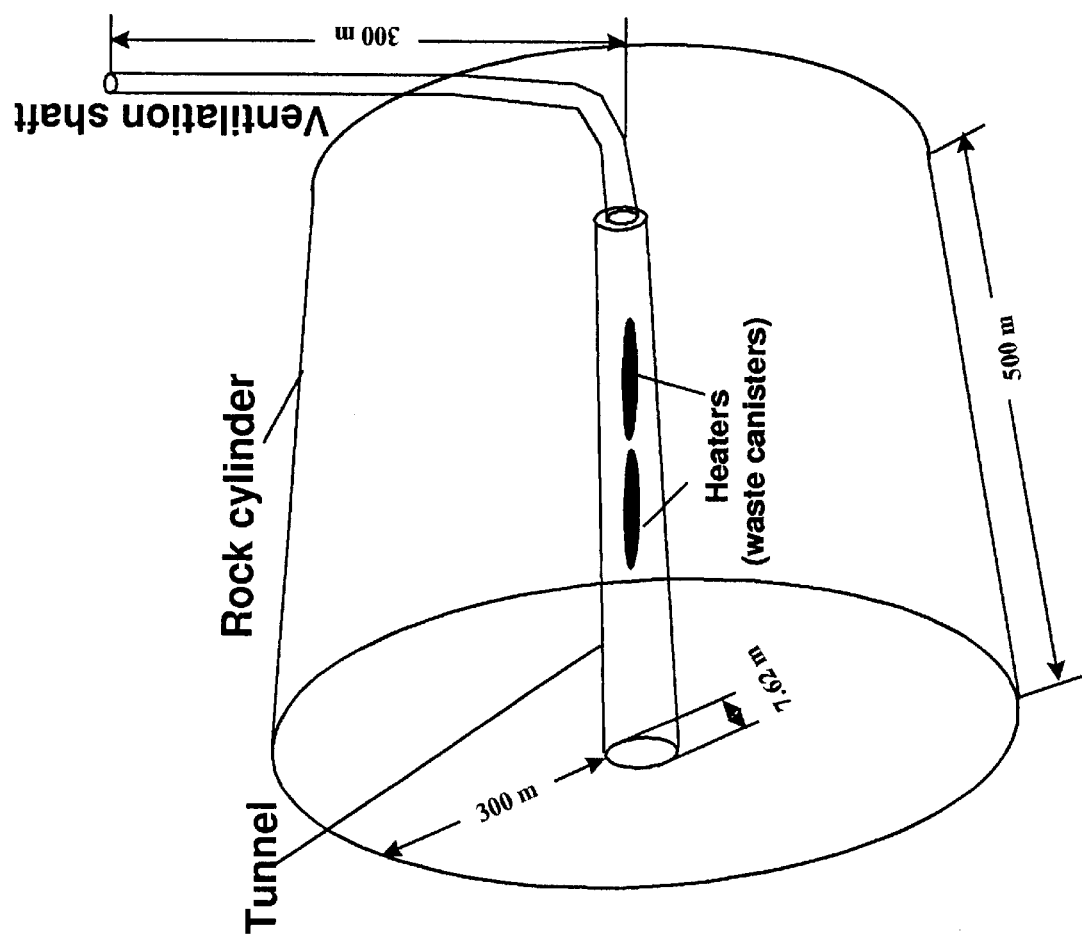
FIG. 2 is a drawing of a conceptual model of natural ventilation in a nuclear waste repository.

A series of simplified simulations were performed using A-TOUGH (Multimedia Environmental Technology, Inc. 1993) to calibrate the model with the measured data from the ESF Tunnel at the Yucca Mountain site. The purpose of this exercise was to demonstrate the applicability of the model to simulation of ventilation and heat removal from a mined opening. The calibrated model was used to perform predictive simulations. The model is conceptually depicted in FIG. 2. These simulations were simplified by assuming an average constant atmospheric temperature, pressure, and humidity outside the tunnel. Effects of higher atmospheric temperature was also evaluated. The amount of air flow generated is dependent on the ambient (outside) atmospheric conditions. In summer months, the flow rate may be reduced and more erratic than in winter months.

The preliminary model was setup to calculate the amount of air flow generated from a small portion of the fuel rod assemblies (about one percent of the total waste). More assemblies may be fitted into the volume considered to generate the amount of flow required. The model consisted of a horizontal cylinder 500 meters long with a diameter of 600 meters. This cylinder was discretized into 20 concentric cylindrical shells with the tunnel represented by the inner-five concentric shells. Therefore, the simulated tunnel has a diameter of about 7.62 meters (25 feet). The rest of the shells represented the surrounding rock. Each shell was subdivided into 16 grid blocks along the axis of the tunnel. A ventilation shaft, 300 meters high and consisting of 12 grid blocks or nodes, was connected to the main tunnel. Therefore, the shaft was simulated with a diameter of 3.048 meters (10 feet). Simulations with a 1 meter (3 feet) diameter shaft were also performed.

A number of simulations were made using the above described mesh setup to study and to evaluate sensitivity of the model to changes in heat load, eddy diffusivity, atmospheric temperature, and the size of the shaft. For this study (as a demonstration simulation), an equivalent heat that would be provided by 52 waste packages was considered (i.e. a total of 445 kilo watts of initial heat load). This is less than one percent of the total waste that is planned to be placed at Yucca Mountain. The thermal load, in the model, was applied to 10 grid blocks at the center of the tunnel, stretching over 400 meters distance. That is a packing density of one per 7.7 meters of tunnel length. This is twice the current planned packing density of one package per 16 linear meters of the tunnel. The thermal load was assumed to decay according to the predicted heat release rate of a waste package (TRW, 1995). The main driving force for the air movement in the tunnel and along the shaft was the buoyancy caused by the temperature of the waste package and the host rock. The initial pressure conditions were the same as a static atmosphere.

For these simulations, an average ambient atmospheric temperature of 15 degrees Celsius was used, which was conservatively high compared to the average annual temperature at Yucca Mountain. A lower mean atmospheric air temperature would result in a larger air flow and cooler temperatures in the waste area. The atmospheric air was assumed to have an average relative humidity of 10 percent. This is consistent with meteorological observations at the site. Higher ambient atmospheric humidity will reduce the drying effectiveness of the system.

RESULTS OF SIMULATION WITH NATURAL VENTILATION AND HEAT LOAD

Figure 3:
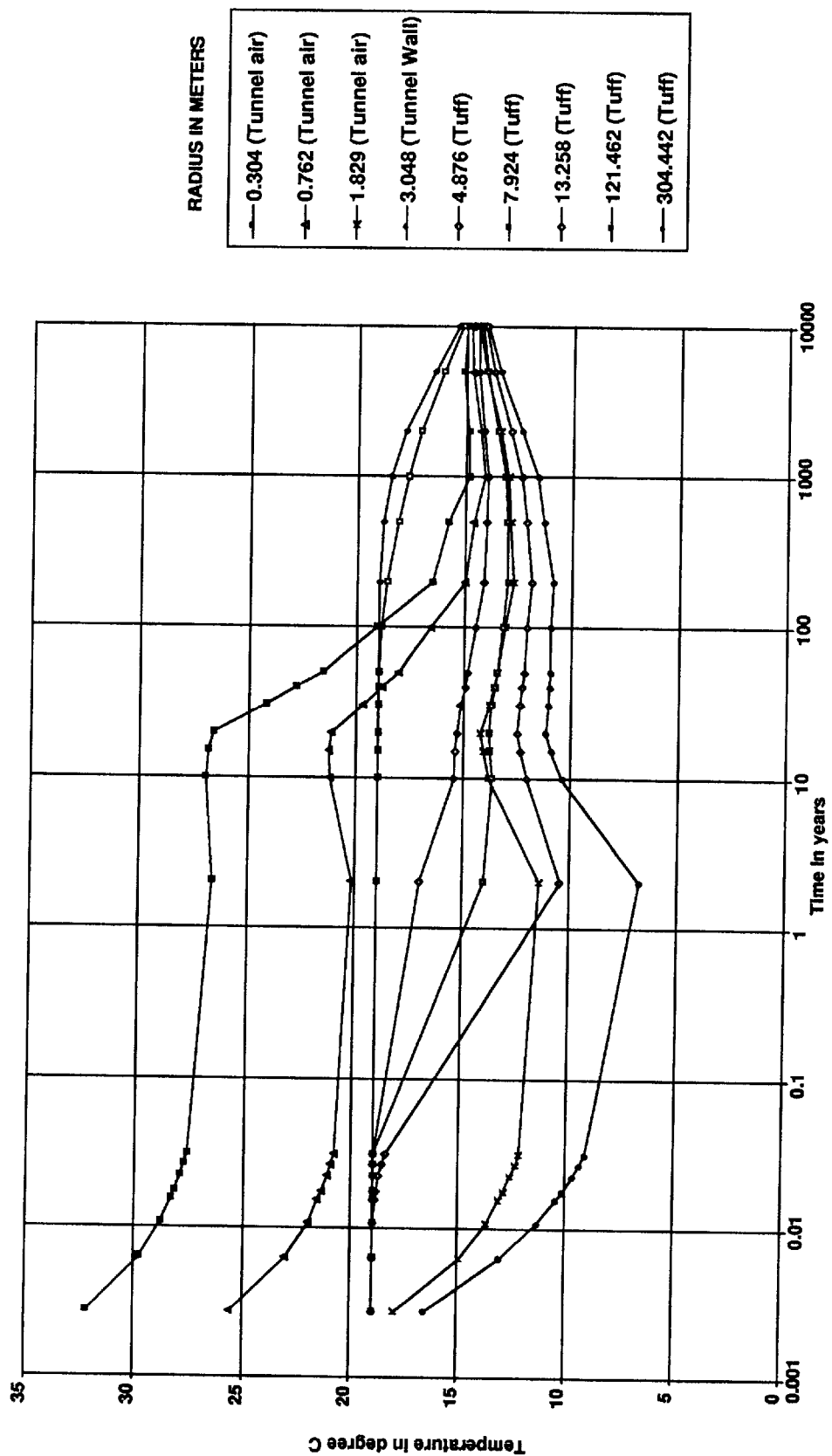
FIG. 3 is a graphical illustration depicting temperature variation with time for various predicted times of a repository.
Figure 4A:
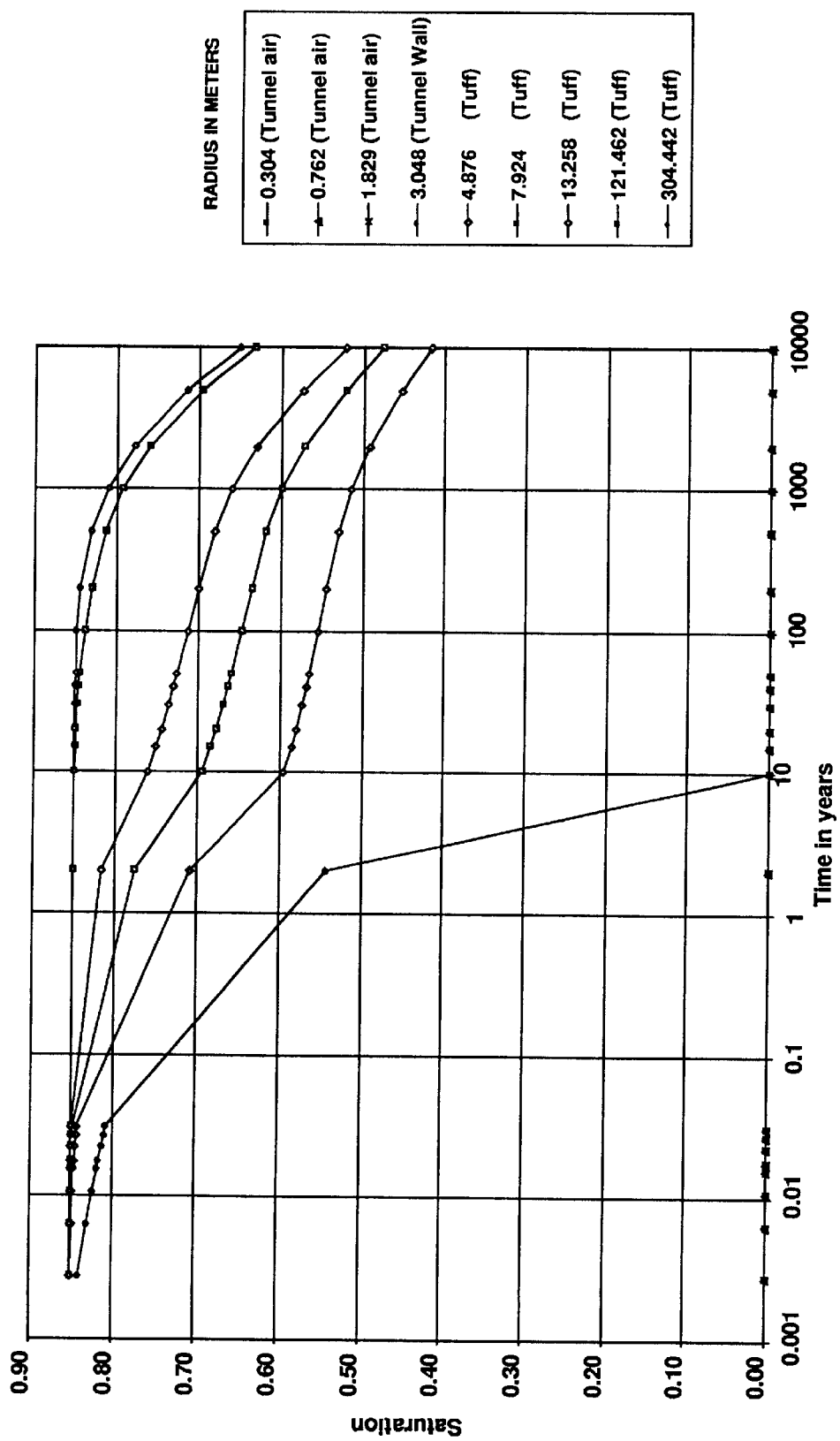
FIG. 4 comprising FIGS. 4a through 4g, graphically illustrates variations in saturation with age of the repository parameter variations including dimensions and time.
Figure 4B:
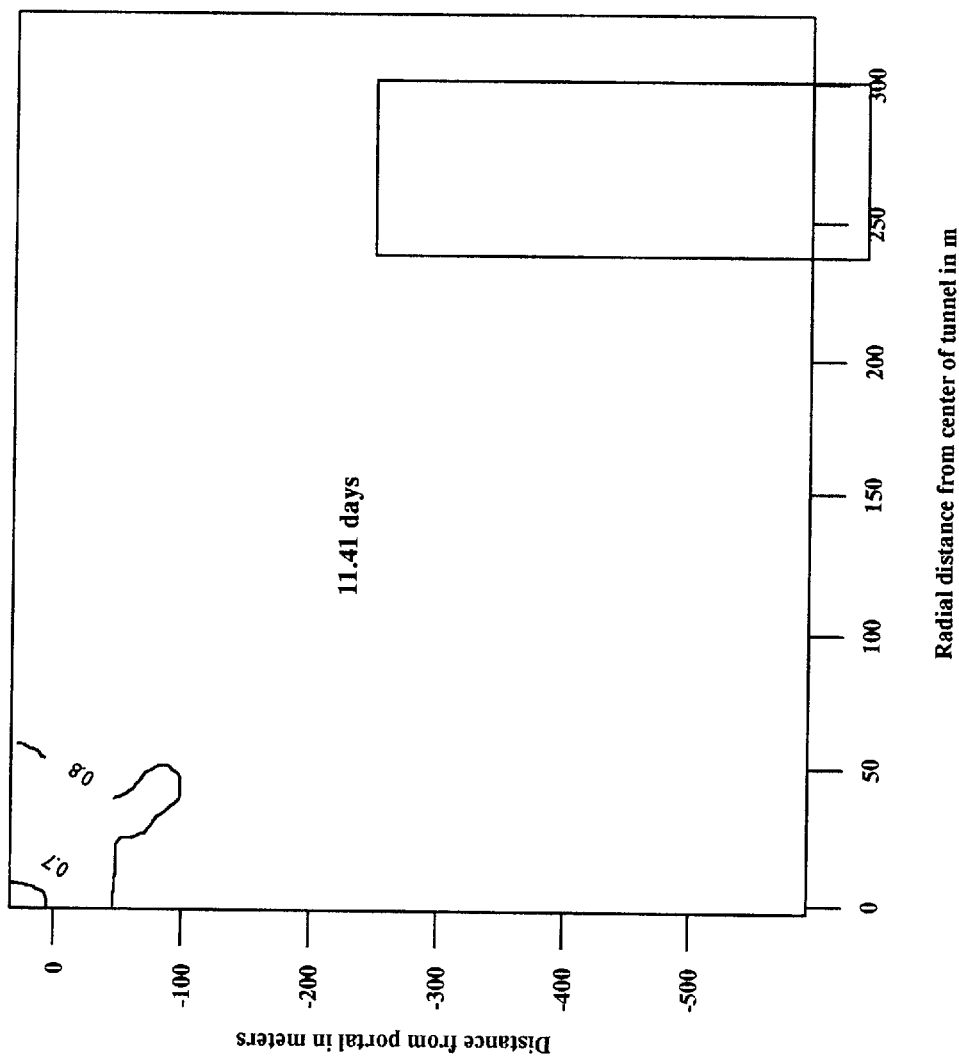
Figure 4C:
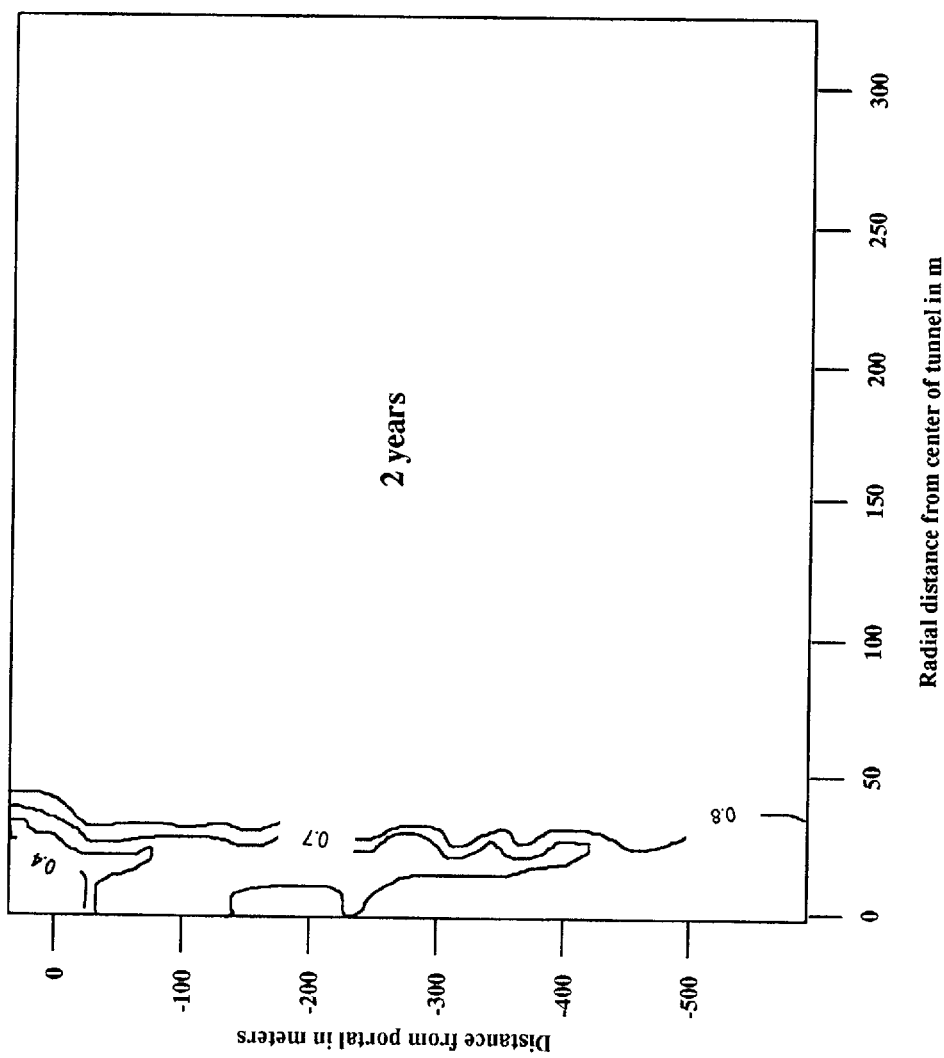
Figure 4D:
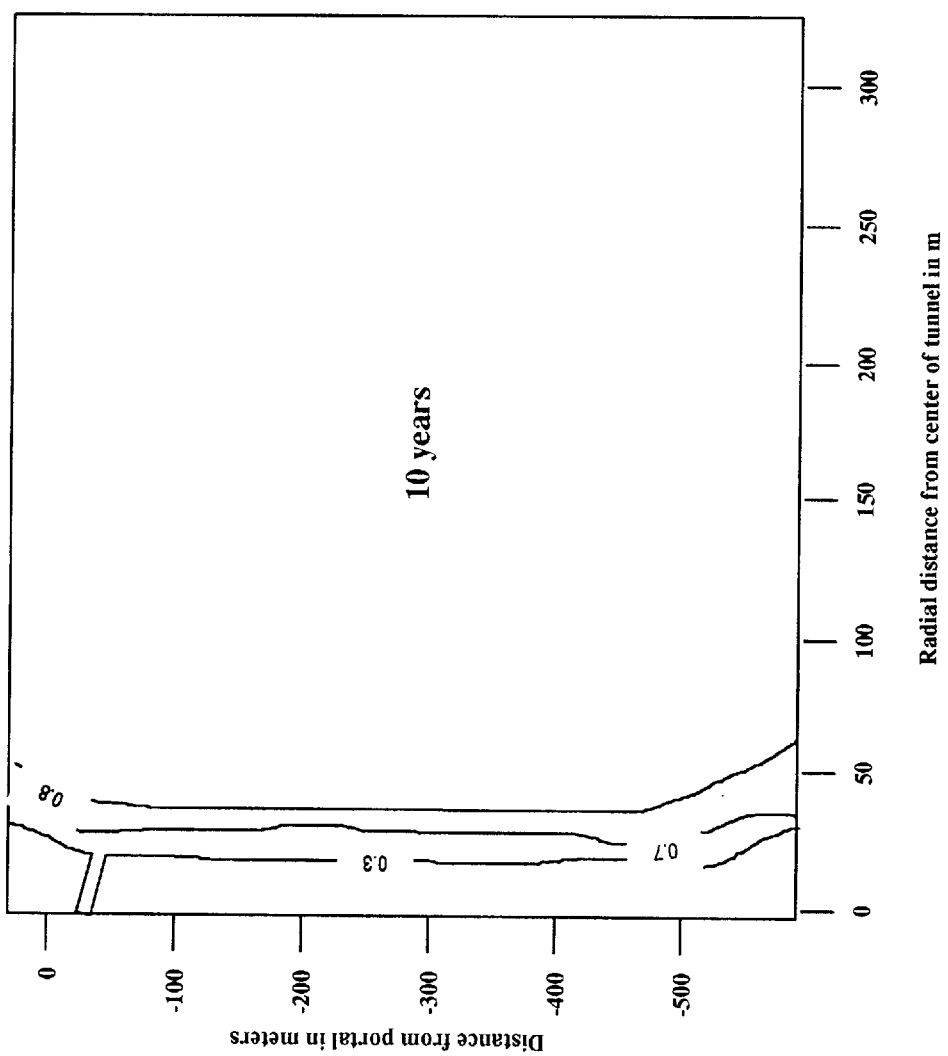
Figure 4E:
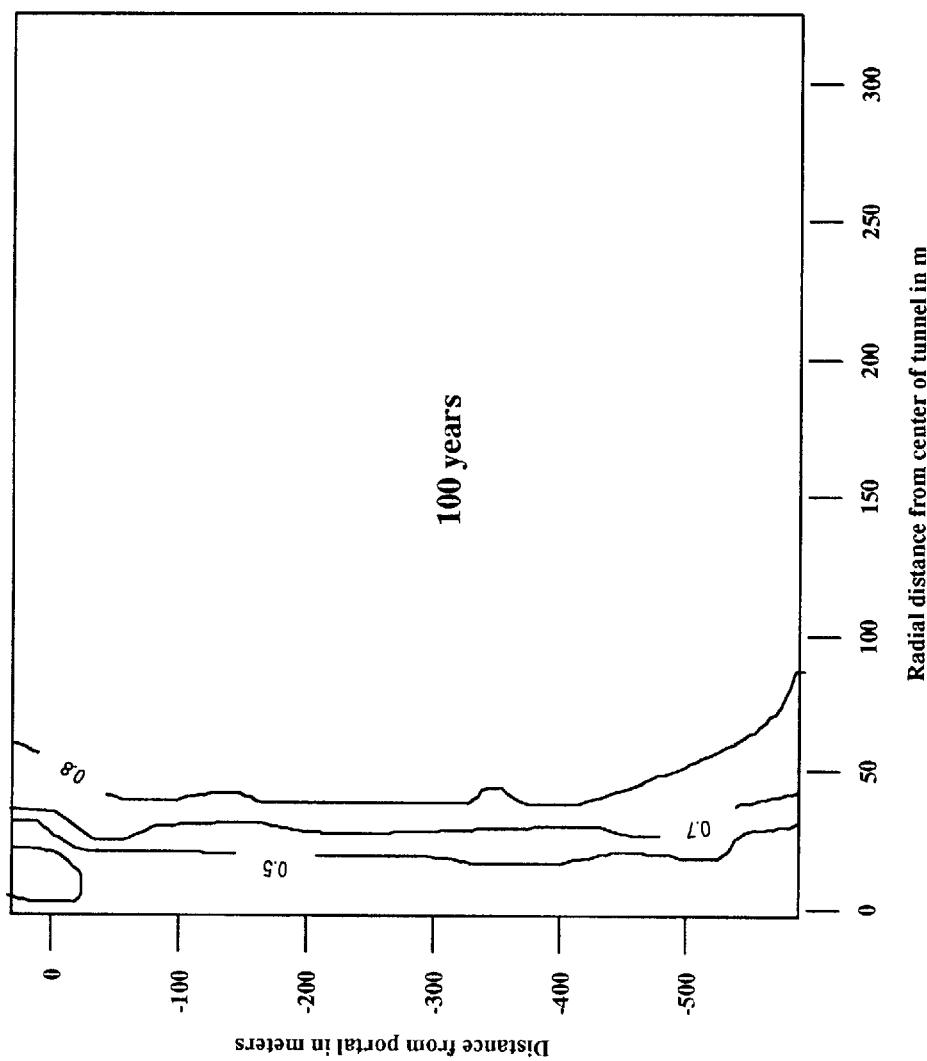
Figure 4F:
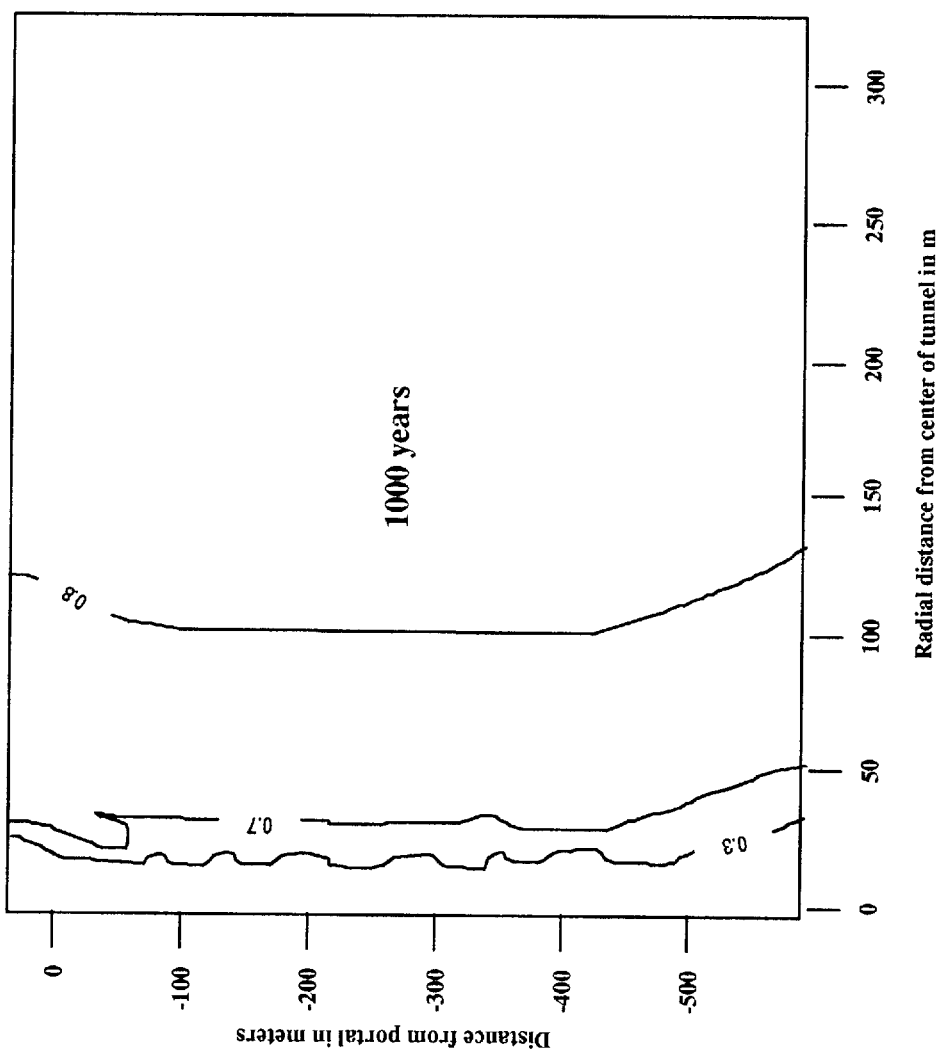
Figure 4G:
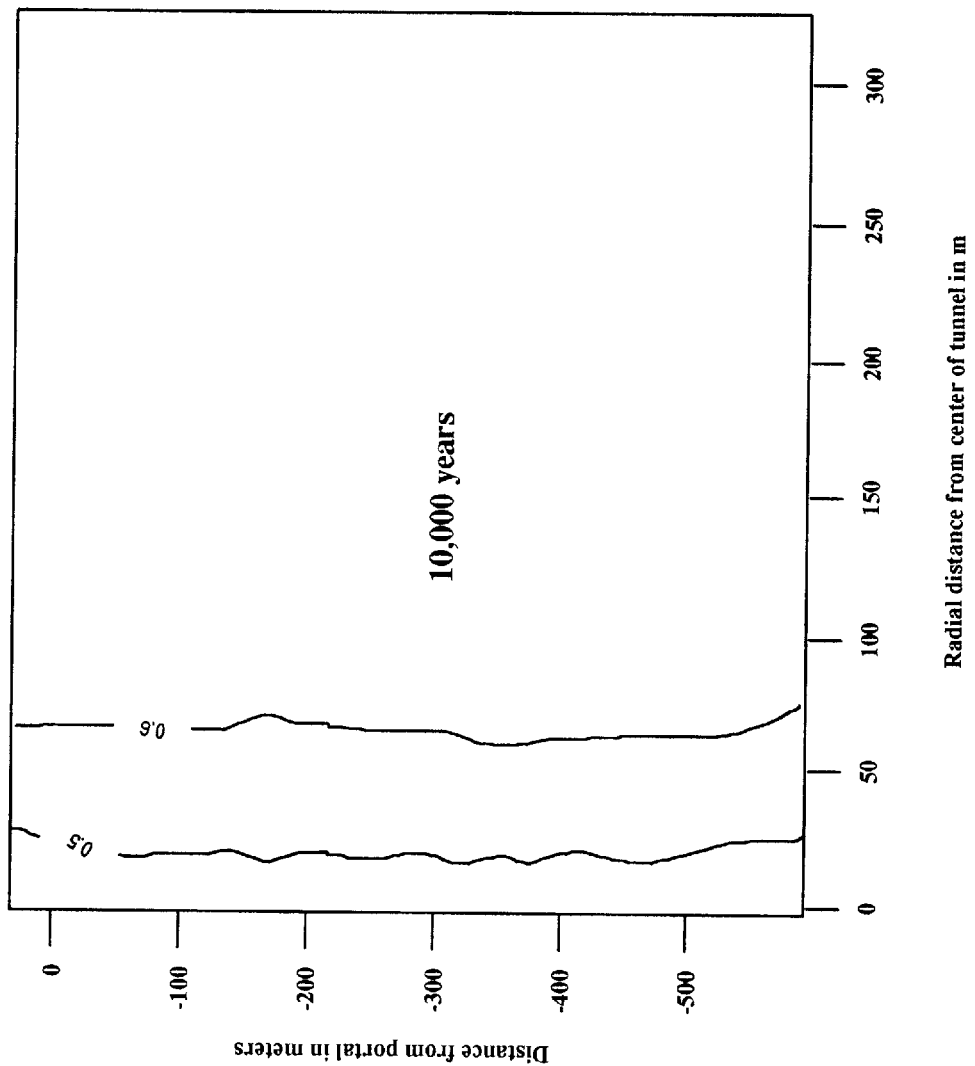

The results of the simulation of a case with eddy diffusivity of 0.01 m$^2$/s are shown in FIGS. 3 and 4. A small temperature gradient (FIG. 3) is still present after 10,000 years when the temperature in the tuff cylinder has begun to equilibrate with the atmospheric temperature of 15 degrees Celsius. The term "tuff" as used herein is defined as a rock formed of volcanic fragments of varied composition. The hot spot in the tunnel near the waste package reaches a maximum of 33 degrees Celsius in a few days. The rock temperature near the tunnel continues to drop below 10 degrees Celsius until after about 20 years when it rises back to approach 15 degrees Celsius. The continued decline in the simulated rock temperature is attributed to the continued flow of air (about 1700 cubic meters/min or 60,000 cfm) caused by the presence of the heat source (waste fuel-rod assembly). As the heat source weakens, the air current in the tunnel also declines in rate. As a result, there is less evaporative cooling and the rock temperature rises to equilibrate with the atmospheric temperature. This pattern can also be observed in the saturation trends in FIG. 4$a$. Capillary pressure gradients remain directed towards the tunnel at all times as may be inferred from the saturation field (FIG. 4$b$).

IMPLICATIONS OF THE SIMULATIONS FOR REPOSITORY DESIGN

Simulations using measured ventilation data suggest that strong air currents may be produced by natural ventilation. Application of natural ventilation aided by heat source generated by the fuel rod assembly may provide a cool and dry host rock with a capillary-pressure gradient toward the emplacement tunnels during the first 10,000 years. This means that the primary mechanism for aqueous transport of the radio nuclides away from the repository may be eliminated. Also by closely packing the waste cannisters, the average required for the repository will be reduced by up to one-half.

Many shafts will be required to implement a naturally ventilated repository. The amount of heat-driven air flow rate will exceed 170,000 m$^3$/min (6 million cfm). Therefore, the potential for a small air-driven electrical plant is substantial. A design for generation of electricity from such air flow rates is discussed below.

CONCEPTUAL DESIGN OF A VENTILATION DRIVEN ELECTRICAL GENERATOR

Figure 5:
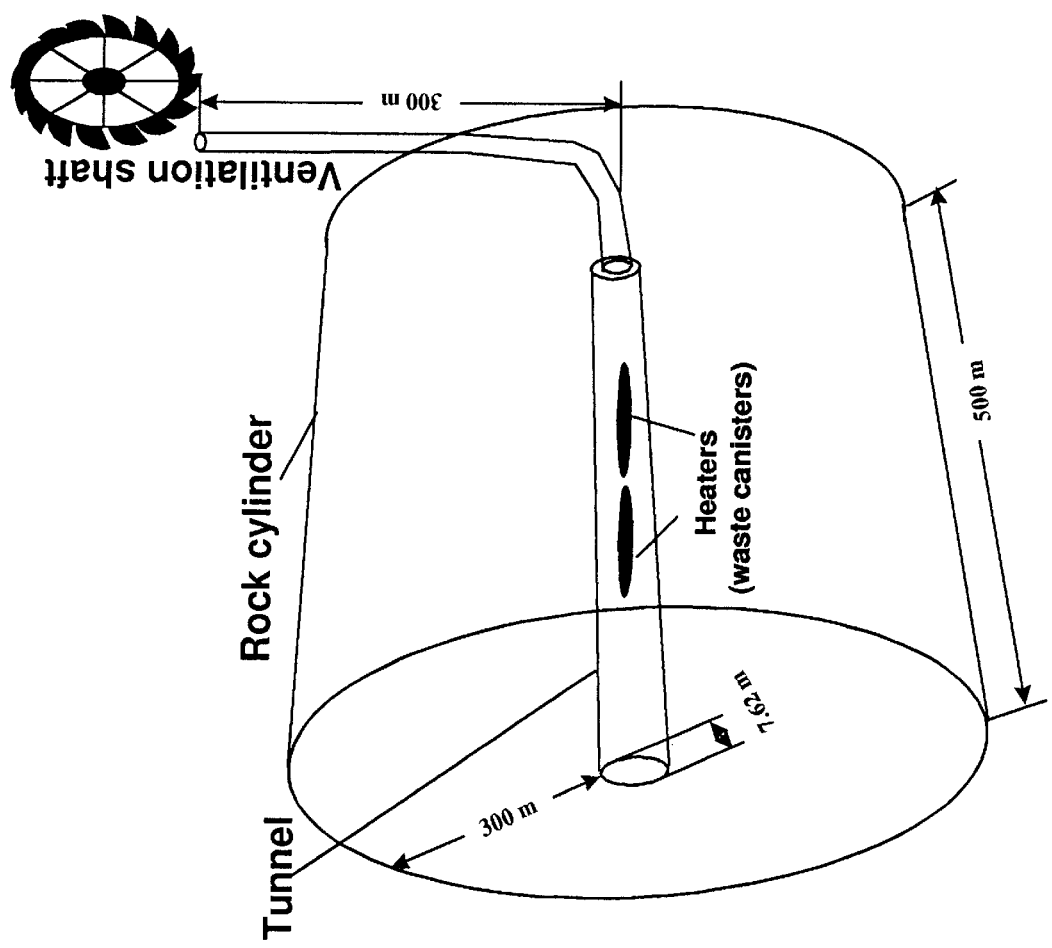
FIG. 5 is a drawing of a conceptual model of natural ventilation for electrical energy generation.

FIG. 5 shows a conceptual design for generation of electricity from a naturally ventilated system. This system can be aided by a heat-driven source, which in case of a high-level radioactive waste repository, would be the spent-fuel assemblies. The air flow is directed to a shaft (or a chimney) of 1 to 3 meters (3 to 10 feet) diameter. The heat source should be placed in a room or tunnel where it is well ventilated from an outside source (atmosphere) which is at an elevation substantially lower than the outlet of the shaft. The inlet and outlet can be at the same elevation; however, the potential for flow of air is greater when elevation differences are large. In the examples shown in this document an elevation difference of 300 meters (1000 feet) has been used. The diameter of the tunnel is 7.62 meters (25 feet). The tunnel or the room can be as large as necessary to accommodate the heat source. In case of the high-level radioactive waste repository, the spent-fuels can be placed in multiple parallel tunnels for safety but the tunnels should all lead into one or several shafts to maximize the flow rate and velocity. The velocity of air is controlled by the diameter of the shaft or the chimney. The shaft or chimney should not be too small to constrict the flow. Three feet is currently considered optimum for this case but the height of the shaft and the length of the air flow paths determines the final size of the shaft diameter and the number of shafts required.

Figure 6:
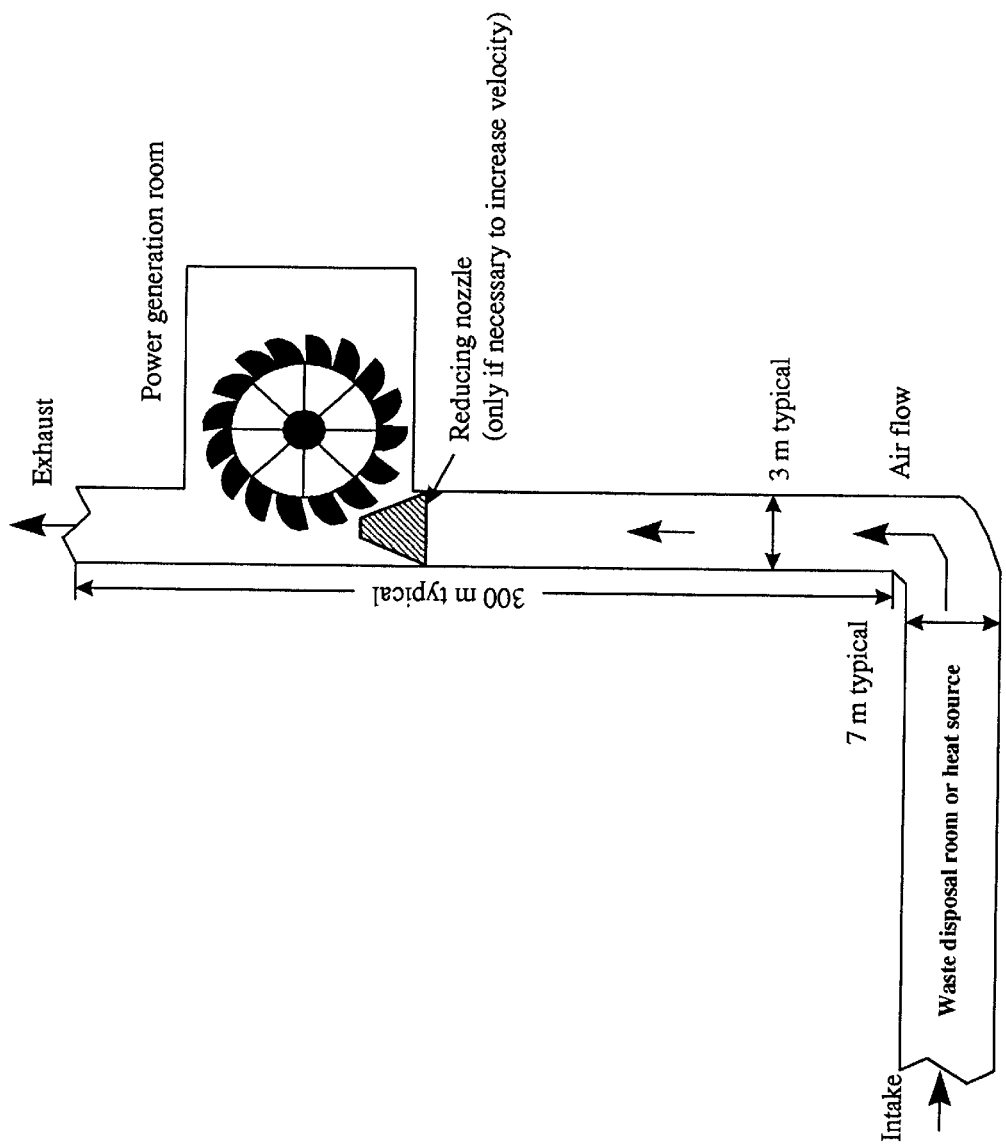
FIG. 6 is a cross-sectional view of a heat source and power generation in accordance with the present invention.
Figure 7:
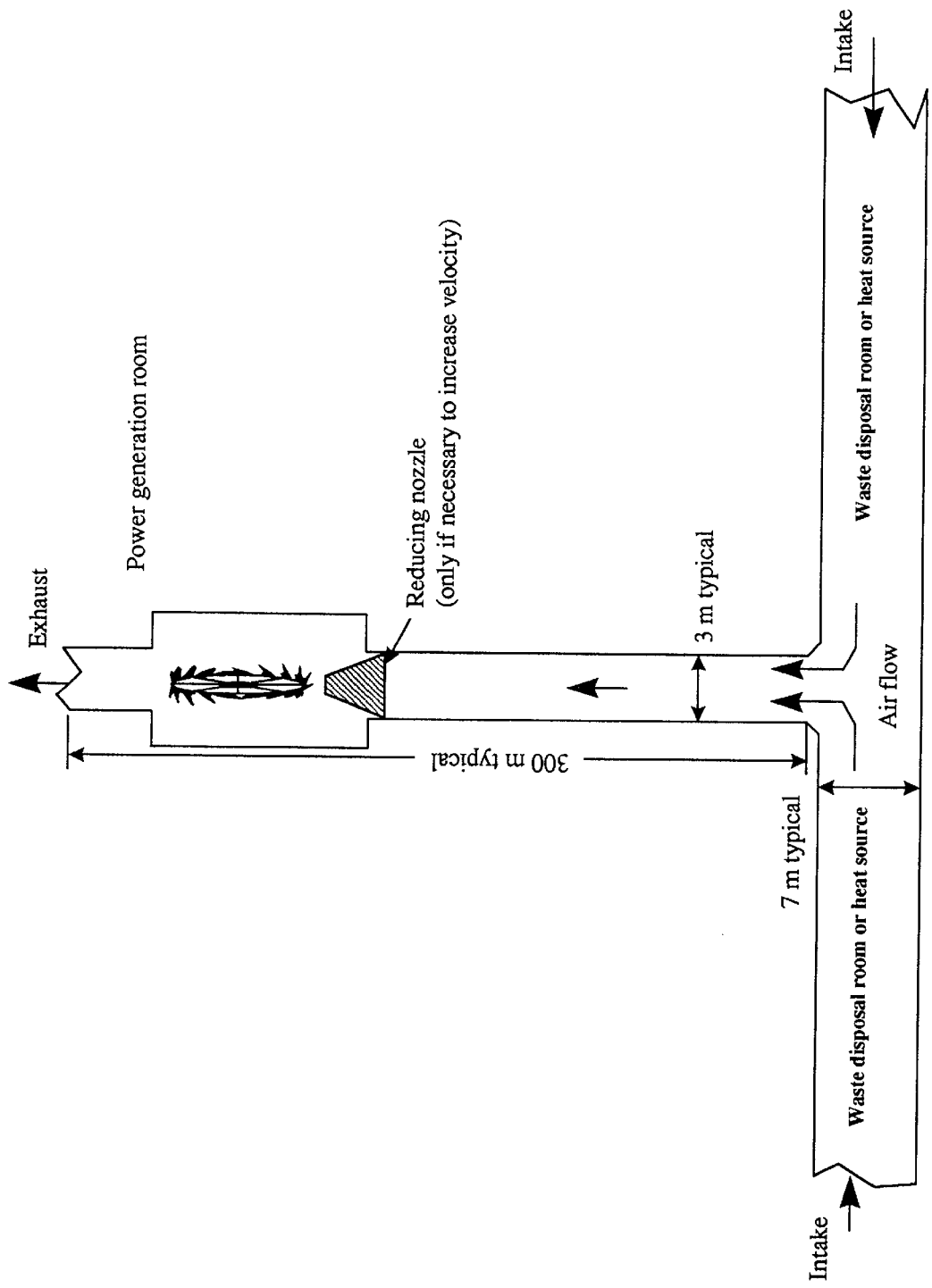
FIG. 7 is a frontal cross-sectional view of a heat source and power generation in accordance with the invention.
Figure 8:
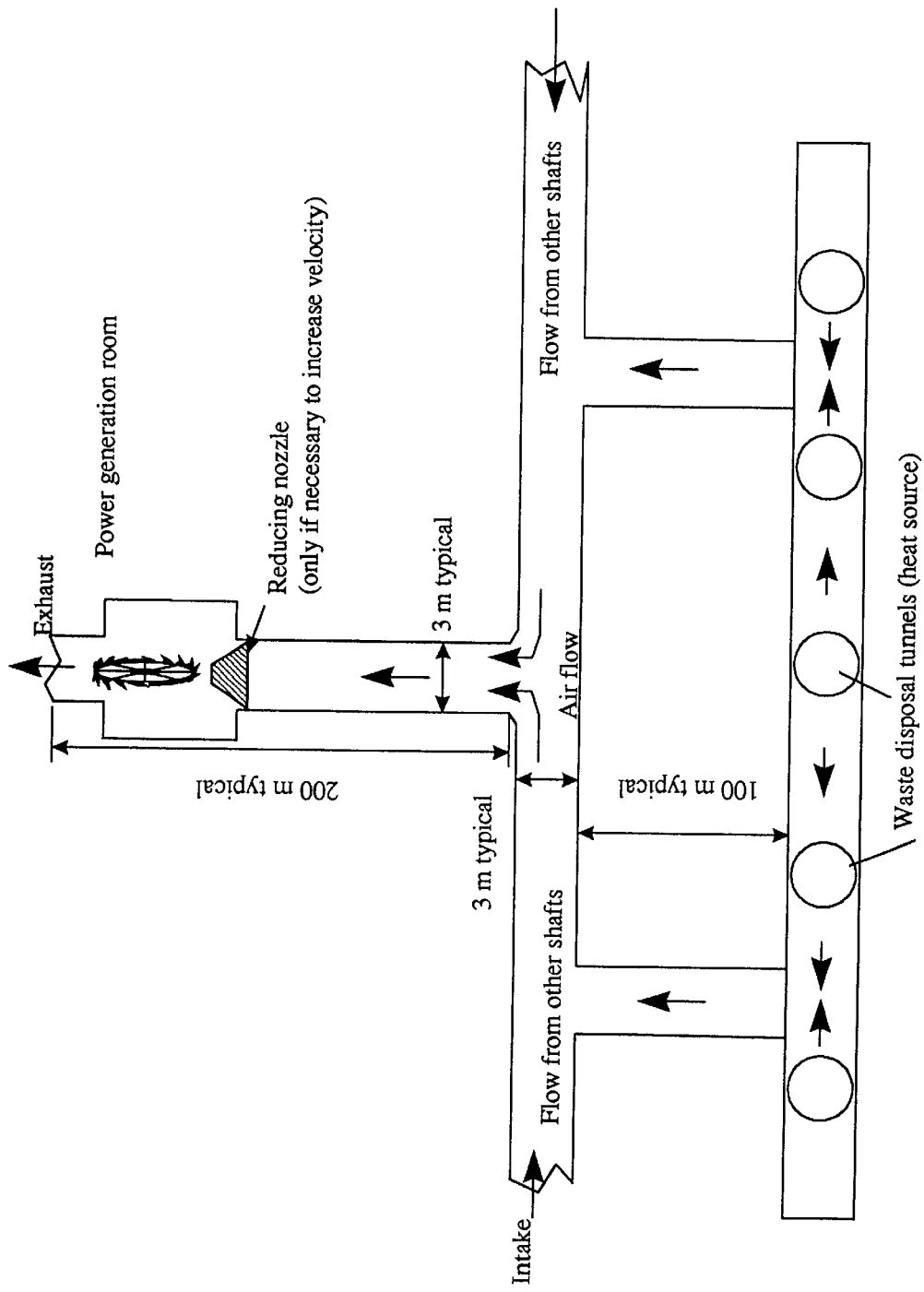
FIG. 8 is a cross-sectional view of a converging shaft configuration using the present invention.
Figure 9:
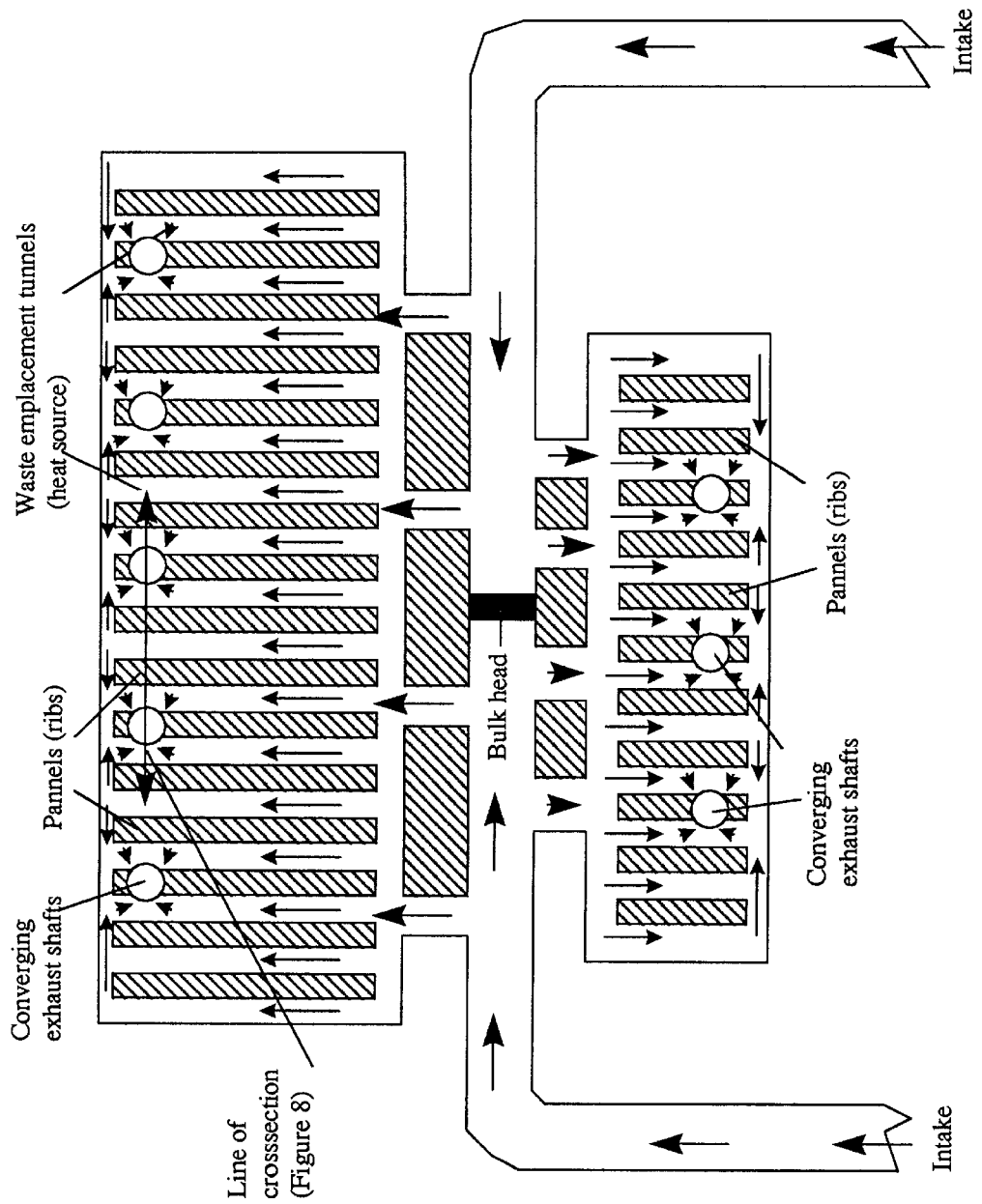
FIG. 9 is a conceptual plan view of a heat source and power generation facility which employs a plurality of converging shafts in accordance with an embodiment of the invention.

FIG. 6 is a schematic cross-section of the tunnel and shaft configuration. The heat source can be placed directly under the shaft or distributed on both sides as shown in FIG. 7. To economize and maximize the air flow, the heat source may need to be directed to the exhaust shaft (or shafts) via several interconnecting shafts and tunnels as shown in FIG. 8. This configuration is more difficult to construct but will provide more flow into the exhaust shaft as opposed to directing the flow into several shafts. In FIG. 9, a conceptual plan view of the distribution of the heat source (spent-fuel assemblies) is shown. In this figure, several shafts are used to collect the flow and heat. The flow from these shafts is redirected to the exhaust shaft as shown in FIG. 8.

Near the exhaust of the shaft (30 to 50 feet from the top) an appropriate turbine should be installed which drives a commercially available electrical generator. The turbine should be light with an adequate vane exposure area to the flow of air. Although windmill-type turbines can be placed horizontally for this purpose, calculations show that these types of turbines are not very efficient in generating electricity. The power generation equation from a windmill-type turbine is given by:

$$p = A \times \rho \times v^3 \times c_p$$

Where p is the power, A is area of flow, $\rho$ is gas density (1.2 kg/m$^3$ at 20 degrees Celsius and 1 atm), v gas velocity (4 m/s), and $c_p$ the power coefficient (assumed 0.6). Based on this equation, only 162.1 watts can be generated from a 3 meters diameter shaft with a flow rate of 1700 m$^3$/min. This is because most of the energy is lost through the flow in between the vanes.

By installing a vertical turbine in the same shaft as shown in FIGS. 5 and 6 but directing the flow directly into the vanes (via a 0.5 meters nozzle), the maximum power that can be generated is given by:

$$P_{max} = A \times \rho \times v_1^3$$

Where $V_1$, is the velocity perpendicular to the vane. With the same parameters but for a 0.5 meters nozzle, the maximum amount of power that can be generated is about 340,000 watts (340 kilowatts). However, in practice, the introduction of nozzle in the air pass and the resistance by the exiting air velocity ($v_2$) reduces the practical amount of power. Nevertheless, even with a 30 percent efficiency, the amount of power generated is over 100 kilowatts from only 1 percent of the waste. If the flow from the entire high-level waste repository is redirected to a 3 meters diameter shaft, the amount of potential electrical power that can be generated exceeds 100 mega watts. It should be noted that not all of this energy comes from the spent-fuel rods since there is not that much energy in the fuel assemblies to begin with. A large portion of this power comes from the rock itself (geothermal energy) which is at a temperature of about 25 degrees Celsius. Therefore, in case the rock is hot as in some geothermal reservoir regions, this concept may be used to generate large amounts of flow and electrical energy without the nuclear heat source.

The amount of electricity calculated here is economical for a high-level radioactive waste repository because the cost of underground construction is already part of the waste disposal effort. The cost of additional underground workings and the generator will be paid off in a few years by the electricity itself. However, for other applications the cost of underground construction may be prohibitive. There are abandoned mines that are located in geothermal regions. These mines may be considered for such an electrical generation facility.

It will now be understood that what has been disclosed herein comprises a unique method and apparatus for generating electrical energy from nuclear waste while increasing the safety of the spent material by reducing temperature and increasing dryness.

Those having skill in the relevant arts will now, as a result of the disclosure made herein, perceive various modifications and additions which may be made to the invention. By way of example, while one method for converting air flow to electric power has been disclosed, it will now be apparent that there are numerous alternatives that will also perform that function in a satisfactory manner. Accordingly, all such modifications and additions are deemed to be within the scope of the invention which is to be limited only by the claims appended hereto and their equivalents.

I claim:

1. In a repository of nuclear waste material that is capable of generating thermal energy in excess of one Kilowatt per meter of length, a structure for generating electrical energy therefrom; the structure comprising:
    a ventilation shaft for channeling heat-induced air flow through a confined chamber;
    an electrical generator positioned within said air flow for generating electrical energy therefrom; and
    wherein said electrical generator comprises a plurality of fan blades mounted on a rotatable shaft, said blades being sequentially positioned in the path of said air flow during rotation of said rotatable shaft.

2. In a repository of nuclear waste material that is capable of generating thermal energy in excess of one Kilowatt per meter of length, a structure for removing heat from the waste and moisture from the repository; the structure comprising:
    an enclosure for confining said material within a physical geometry that provides elevation difference between the entry and exit of air flow;
    a ventilation shaft for channeling heat-induced air flow out of said enclosure; and
    a generator in communication with said ventilation shaft and having a plurality of fan blades mounted on a rotatable shaft, said blades being sequentially positioned in the path of said air flow during rotation of said rotatable shaft.

3. In an underground facility which may be natural or man-made and that is at a temperature above the mean atmosphere temperature, a structure for generating electrical energy therefrom; the structure comprising:
    a ventilation shaft for channeling heat-induced air flow through a confined chamber; and
    an electrical generator positioned within said air flow for generating electrical energy therefrom; and
    wherein said electrical generator comprises a plurality of fan blades mounted on a rotatable shaft, said blades being sequentially positioned in the path of said air flow during rotation of said rotatable shaft.

4. A method for generating electrical energy from a repository of nuclear waste material that is at a temperature above mean atmosphere temperature; the method comprising the steps of:
    a) providing a ventilation shaft for channeling heat-induced air flow through a confined chamber; and
    b) positioning an electrical generator within said chamber to be in the path of said air flow for generating electrical energy therefrom.

* * * * *